United States Patent
Gregory et al.

(10) Patent No.: US 9,489,759 B1
(45) Date of Patent: Nov. 8, 2016

(54) FILE PATH TRANSLATION FOR ANIMATION VARIABLES IN AN ANIMATION SYSTEM

(71) Applicant: Pixar, Emeryville, CA (US)

(72) Inventors: Eric Gregory, Emeryville, CA (US); Brett Levin, Emeryville, CA (US)

(73) Assignee: PIXAR, Emeryville, CA (US)

( * ) Notice: Subject to any disclaimer, the term of this patent is extended or adjusted under 35 U.S.C. 154(b) by 212 days.

(21) Appl. No.: 14/147,000

(22) Filed: Jan. 3, 2014

(51) Int. Cl.
*G06T 13/00* (2011.01)

(52) U.S. Cl.
CPC .................... *G06T 13/00* (2013.01)

(58) Field of Classification Search
None
See application file for complete search history.

(56) References Cited

U.S. PATENT DOCUMENTS

| | | | | |
|---|---|---|---|---|
| 5,680,619 A * | 10/1997 | Gudmundson | ... | G06F 17/30014 707/E17.013 |
| 8,365,141 B1 * | 1/2013 | Yan | ... | G06F 8/34 717/104 |
| 2005/0253846 A1 * | 11/2005 | Russ | ... | G06T 13/40 345/473 |
| 2009/0288093 A1 * | 11/2009 | Thurgood | ... | G06F 8/36 718/104 |

* cited by examiner

*Primary Examiner* — Ryan D McCulley
(74) *Attorney, Agent, or Firm* — Kilpatrick Townsend & Stockton LLP

(57) ABSTRACT

Systems and methods for customizing animation variables and modifications to animation variables in an animation system are provided. An animated model may be comprised of a hierarchical structure of rigs and sub-rigs. An animator may customize the location of animation variables within the hierarchical structure through a relocation operation from an original position to a relocated position. The animation system identifies the relocation operation, resulting in an association being generated between the original position and the relocated position. Modifications made to animation variables in the animation system may be received by the animation system and the animator can customize the scope of the modification and its application to the animated model or animated scene.

18 Claims, 11 Drawing Sheets

Relocation Table for Hand_Rig

| Reference Location | Alias Location | |
|---|---|---|
| Hand_Rig/Rig/Index Finger/Anim.x | Hand_Rig/Anim/Index Finger.x | 806 |
| Hand_Rig/Rig/Thumb/Anim.x | Hand_Rig/Anim/Thumb.x | 808 |
| Hand_Rig/Rig/Pinky Finger/Anim.x | Hand_Rig/Anim/Pinky Finger.x | 810 |
| | | |
| | | |
| | | |
| | | |

*FIG. 8*

FILE PATH TRANSLATION FOR ANIMATION VARIABLES IN AN ANIMATION SYSTEM

BACKGROUND

The present disclosure relates generally to methods and system for modifying file paths for animation variables and referencing the modified locations for animation variables in an animation system.

In computer animation, animated characters (or models) are built using a combination of instances of objects (e.g., finger, hand, arm, torso), where each object may have a corresponding rig for determining changes to the object. For example, a rig for an animated model in the form of a human may comprise a rig for each of the objects emulating the shape of the human skeleton (e.g., finger rig, hand rig, arm rig, torso rig). The animators interact with an animation user interface that includes a set of parameters or animation variables ("avars") that can be used to adjust a particular rig. A single object in an animated scene may incorporate hundreds or thousands of avars with each avar being located on a specific path. Animators may modify an avar for an object, and an animation system may read the data for the modification and perform the necessary calculations to determine how the object would behave, move, look in a virtual or simulated environment. The animation result is then often rendered for display on a 2D or 3D display.

As an animator is working with an animated model in an animated scene, the animator may need to make modifications to avars for certain rigs associated with the animated model. For example, the animator may need to modify a finger rig so that a finger of the animated model has a desired shape. Previously, in order to manipulate an avar for the finger, animators would be required to traverse the hierarchical structure from a human rig, through a body rig, a torso rig, arm rig, hand rig, and down to a finger rig. Being required to traverse multiple nested layers of rigs in such a manner, however, can be cumbersome and time-consuming.

In addition, previously, when an animator wanted to establish a new default for an avar, the animator would have to traverse the hierarchical structure to the avar and make the change in that specific location. For small changes to a finger, for example, as noted above, the animator would be required to expend time and resources by having to go through multiple nested layers of rigs.

Accordingly, what is desired are improved methods and apparatuses for solving some of the problems discussed above.

BRIEF SUMMARY

Embodiments of the present invention can determine how to relocate animation variables and translate path locations in order to provide a more manageable file path system for interacting with the animation variables (avars) for animated objects. For example, a hand rig for an animated model may consist of a plurality of sub-rigs for each finger of the hand. A relocation table can be used to effectively make a finger animation variable be part of a hand rig, and utilize a proper mover to change the finger animation variable.

Further, embodiments of the present invention can determine how modifications to animation variables are propagated through an animated model or animated scene. For example, when a modification is made to an animation variable, embodiments allow the modification to apply with a customizable scope within the animation system (e.g., the modification can apply narrowly at the point of modification or broadly apply to multiple instance of the animation variable in the animation system).

A better understanding of the nature and advantages of various embodiments of the present invention may be gained with reference to the following detailed description and the accompanying drawings.

BRIEF DESCRIPTION OF THE DRAWINGS

FIG. 8 depicts an example relocation table using the rigs depicted in FIGS. 3-7, according to an embodiment of the invention.

DETAILED DESCRIPTION

Figure 1:
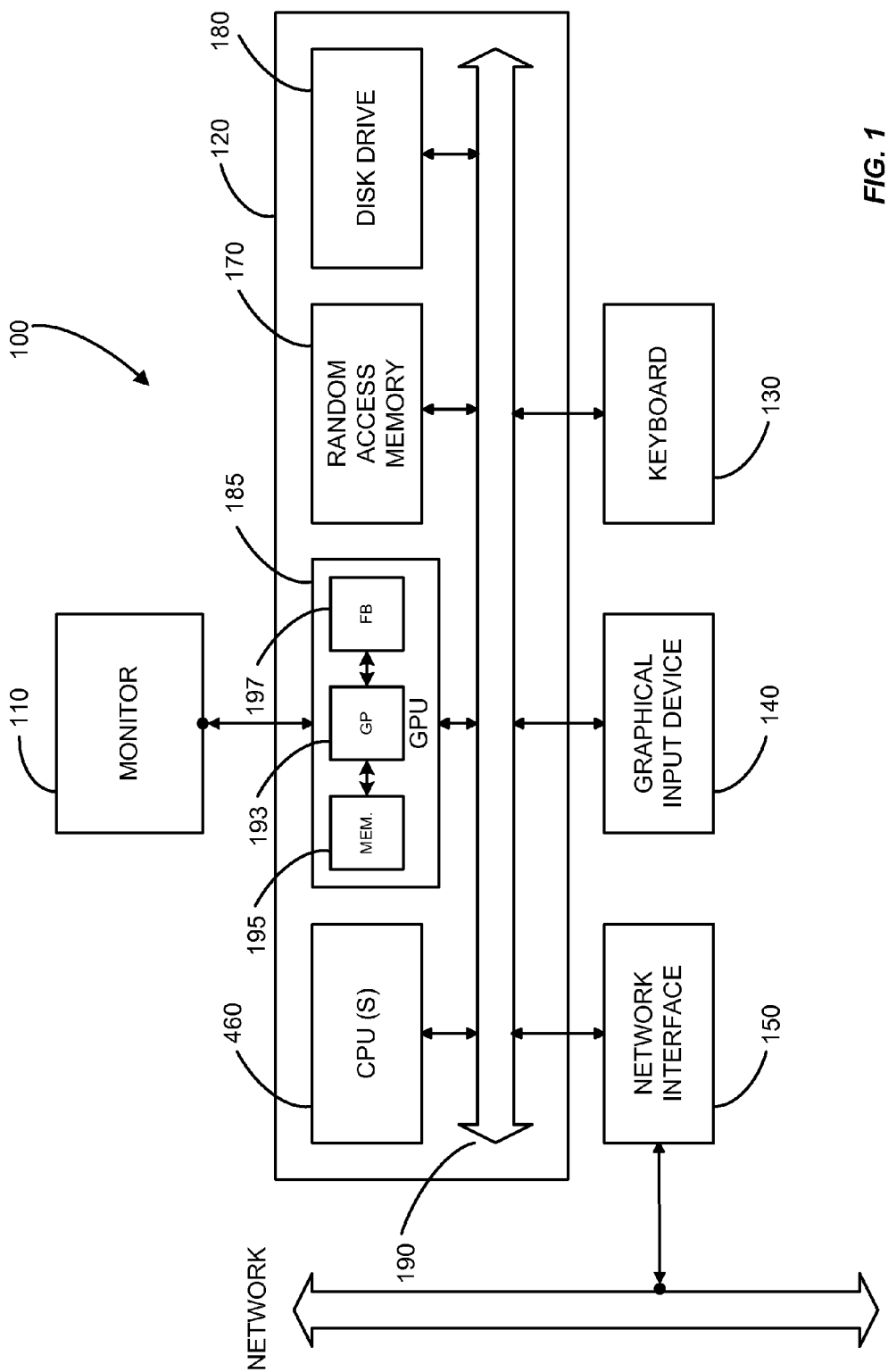
FIG. 1 illustrates a general-purpose computing system suitable for implementing some embodiments of the invention.

Creating computer-generated animation involves specifying animated models (e.g., characters, props, sets, backgrounds) and their behaviors, as well as the environments the animated models will be placed in and/or interact with. This process further involves providing animation data representing an animator's specifications to an animation system that reads the animation data and performs the requisite calculations to determine how to realistically model and render the animated data into a virtual or simulated environment. This includes determining not just the physical look of the animated models, but also determining accurate movements and behaviors for the animated models.

Determining the physical look, movement and behavior of animated models can be accomplished by modifying animation variables ("avars") that manipulate various aspects of the animated models. Avars can be manipulated manually be the animators through interfaces or through hierarchical rig structures for the animated models. This can present challenges as the animator may need to traverse through a significant amount of the rig structure to modify an avar deep within the rig structure.

In addition, when the animator wants to make a change to an avar that has a global effect (e.g., a modification that is to be applied to all animated models that reference that avar), the animator would typically have to traverse to the location of the avar and make the modification.

One embodiment of the present invention can provide customization of animation variables for models in an animation system in order to provide a more streamlined interface for manipulating animation variables for animated models. For example, an animation system can be configured to allow an animator to relocate animation variables between rigs and sub-rigs of an animated model, while preserving the location referencing and the functionality of the animation variables.

An additional embodiment of the present invention can provide customization of the scope of an edit to an animation variable while working with an animated model in the context of an animated scene. For example, an animation system can be configured to allow a change made to an animation variable in the context of a scene to propagate down to the location of the animation variable within the rig structure, which applies the modification to all instances of rigs that include the animation variable.

A brief description of example systems that may be used to practice some embodiments of the invention are first provided.

I. Animating Using Avars

Animated scenes can consist of one or more animated models. Animated models may be used to represent characters, props, architecture and sets for the animated scene. Each animated model may be comprised of multiple elements that make up the animated model. For example, animated models in the form of a human character would have similar elements, such as a head, a torso, arms, legs, hands, and fingers. An instance of an element of the animated model may be composed of an instance of an element rig that may be used to perform a specific function or provide a specific shape. Each element rig may be comprised of sub-instances of sub-rigs (e.g., an instance of hand rig for a human character may include five sub-instances of a finger rig). The reference to instances and sub-instances are used to differentiate between elements and sub-elements of the animated model. Using the rigging for an animated model, an animator can specify a pose of the animated model for a still image and/or specify how the animated model is to move from pose to pose in an animation.

In some situations, an animator may desire to modify an animated model in an animated scene. In order to accomplish modifications, the animator may manipulate or modify animation variables ("avars") that allow the animator to adjust different settings (e.g., direction, motion, shape, physical appearance). The manipulation of avars over a successive series of frames can present the appearance of the animation model moving within an animated scene.

The animator may want the avars for a sub-rig (e.g., a finger) in a more accessible location in order to make it easier to access the avars for the sub-rig while maintaining the functionality of the sub-rig in its original location.

II. Example Systems

FIG. 1 is a block diagram of a computer system 100 that may be used to implement or practice various embodiments of an invention whose teachings may be presented herein. FIG. 1 is merely illustrative of a general-purpose computer system or specific information processing device for an embodiment incorporating an invention whose teachings may be presented herein and does not limit the scope of the invention as recited in the claims. One of ordinary skill in the art would recognize other variations, modifications, and alternatives.

In one embodiment, computer system 100 can include a monitor 110, a computer 120, a keyboard 130, a graphical input device 140, a network interface 150, and/or the like. Monitor 110 may typically include familiar display devices, such as a television monitor, a cathode ray tube (CRT), a liquid crystal display (LCD), or the like. The monitor 110 may provide an interface to the graphical input device 140, such as incorporating touch screen technologies.

The computer 120 may typically include familiar computer components, such as a processor 160 and one or more memories or storage devices, such as a random access memory ("RAM") 170, one or more disk drives 180, a graphics processing unit ("GPU") 185, and/or the like. Computer 120 may include a system bus 190 interconnecting the above components and providing functionality, such as inter-device communication.

In further embodiments, the computer 120 may include one or more microprocessors (e.g., single core and multi-core) or micro-controllers, such as PENTIUM™, ITANIUM™, or CORE™ 2 processors from Intel of Santa Clara, Calif. and ATHLON™, ATHLON™ XP, and OPTERON™ processors from Advanced Micro Devices of Sunnyvale, Calif. Further, the computer 120 may include one or more hypervisors or operating systems, such as WINDOWS®, WINDOWS® NT, WINDOWS® XP, WINDOWS VISTA®, or the like from Microsoft®, SOLARIS™ from Sun Microsystems®, LINUX™, UNIX®, and UNIX®-based operating system.

In various embodiments, the graphical input device 140 may typically be embodied as a computer mouse, a trackball, a track pad, a joystick, a wireless remote, a drawing tablet, a voice command system, an eye tracking system, or the like. The graphical input device 140 may allow a user of computer system 100 to select objects, icons, text, user interface widgets, model or rigging elements or handles, or other user interface elements that appear on the monitor 110 via a command, such as a click of a button or the like on the graphical input device 140.

In some embodiments, the network interface 150 may typically include a communications interface, an Ethernet card, a modem (telephone, satellite, cable, ISDN), (asynchronous) digital subscriber line (DSL) unit, FireWire interface, USB interface, or the like. For example, the network interface 150 may be coupled to a computer network, to a FireWire bus, a USB hub, or the like. In other embodiments, the network interface 150 may be physically integrated as hardware on the motherboard of the computer 120, may be implemented as a software program, such as soft DSL or the like, or may be implemented as a combination thereof.

In various embodiments, the computer system 100 may also include software that enables communications over a network, such as the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to the computer system 100.

The RAM 170 and disk drive 180 are examples of machine-readable articles or computer-readable media configured to store information, such as computer programs, executable computer code, human-readable source code, shader code, rendering engines, or the like, and data, such as image files, models including geometrical descriptions of objects, ordered geometric descriptions of objects, hierarchies of models, procedural descriptions of models, scene descriptor files, or the like. Other types of computer-readable storage media or tangible machine-accessible media include floppy disks, removable hard disks, optical storage media such as CD-ROMS. DVDs and bar codes, semiconductor memories such as flash memories, read-only-memories (ROMS), battery-backed volatile memories, networked storage devices, or the like.

In some embodiments, the GPU 185 may include a conventional graphics processing unit. The GPU 185 may include one or more vector or parallel processing units that may be user programmable. Such GPUs may be commercially available from NVIDIA®, ATI™, and other vendors. In this example, the GPU 185 can include one or more graphics processors (GP) 193, a number of memories and/or registers (MEM.) 195, and a number of frame buffers (FB) 197.

As explained, FIG. 1 is merely representative of a general-purpose computer system or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may include techniques described above as implemented upon a chip or an auxiliary processing board.

Figure 2:
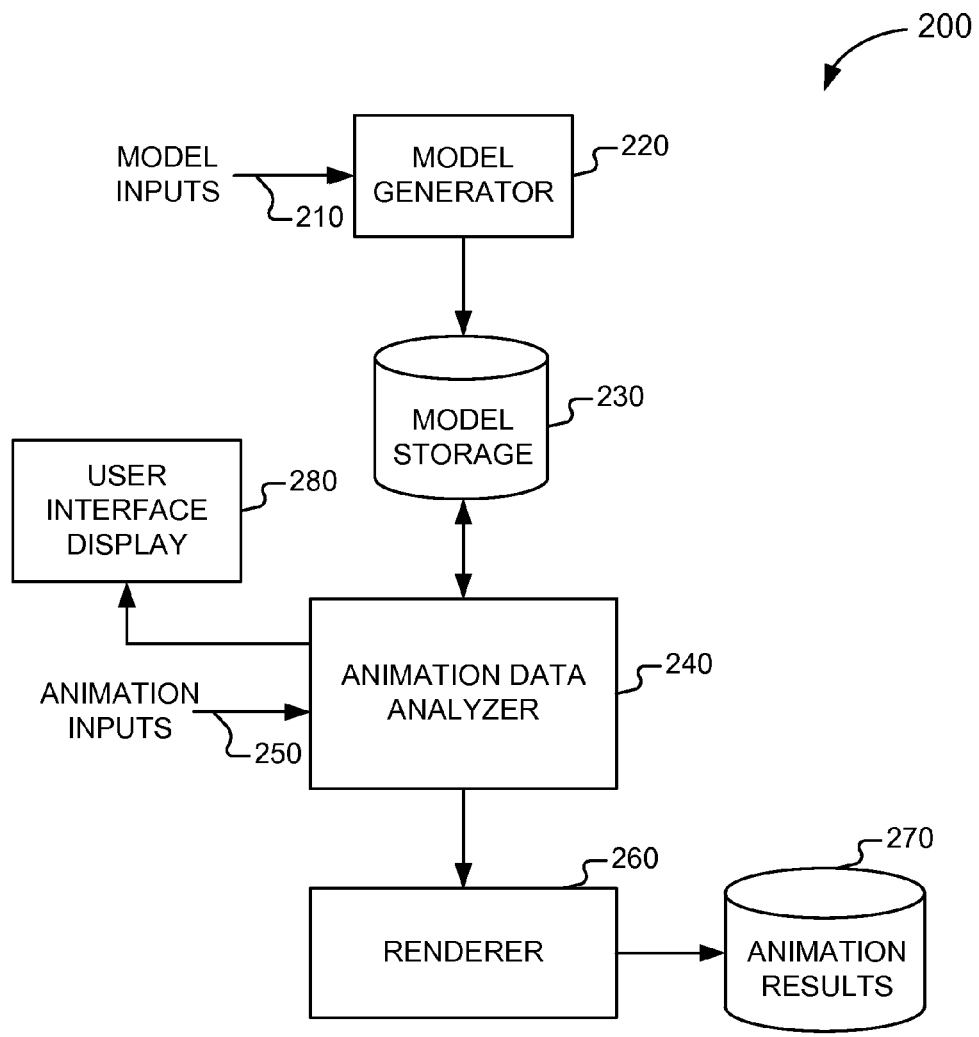
FIG. 2 illustrates a block diagram of components of a system that may be used to practice some embodiments of the invention.

FIG. 2 illustrates an animation system 200 that may be used to generate animated images. Various components of the animation system 200 can be implemented in software, hardware or a combination thereof. It should be understood, even if not explicitly displayed, that functionality can be represented by programming instructions stored in memory suitable for being read by a processor that in turn executes those programming instructions. Using the animation system 200, an animator can generate computer models and animation using those models. As illustrated, the animation system 200 may comprise a model generator 220, a model storage unit 230, an animation data analyzer 240, a renderer 260, an animation results storage unit 270, and a user interface display 280.

As noted, the animation system 200 comprises the model generator 220 that is capable of generating animated models from model inputs 210. The model inputs 210 can be inputs from a user interface, from another computer process, from model storage 230 or other sources.

In some embodiments, the model generator 220 may receive one or more pre-generated animated models as model inputs 210. In some embodiments, the model inputs 210 can be models of objects and/or characters, or data created by an animator that allows the model generator 220 to create models of objects and/or characters.

In other embodiments, the animated models may be pre-generated and pre-modeled prior to being sent as animation inputs 250 to the animation system 200. In such embodiments, the animation system 200 may not need to access the model generator 220 for the animated models. In other embodiments, some animated models may be sent as animation inputs 250, while other animated models are generated by the model generator 220 based on model inputs 210. The animation inputs 250 may also include animated data including frames of animated sequences that are to be joined or appended to each other. The animation inputs 250 may also include animation settings, including user-defined constraints such as minimum thresholds and maximum thresholds that the animation data analyzer 240 may utilize in order to blend animation sequences.

Figure 3:
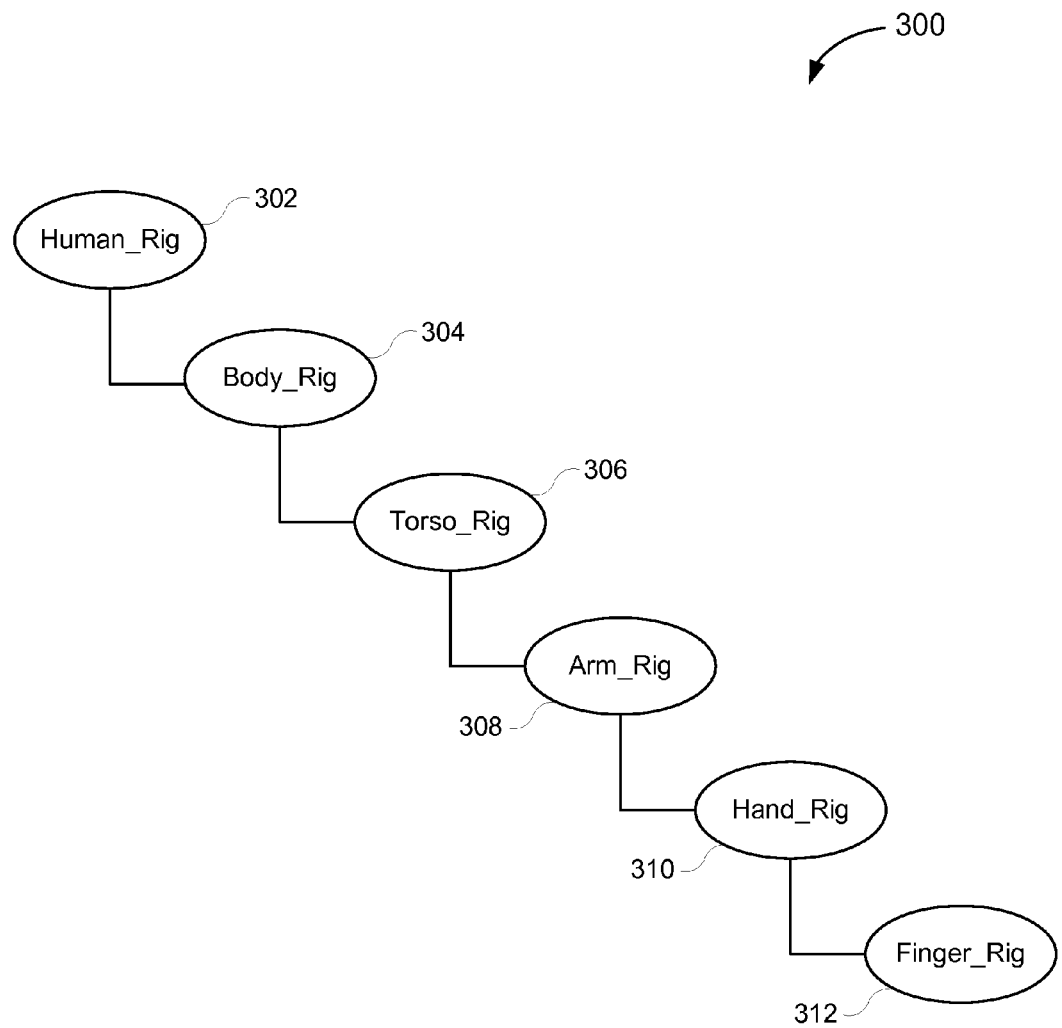
FIG. 3 illustrates a rig structure for an animated model in an animation system that may be used to practice some embodiments of the invention.

The model inputs may comprise pre-generated rig structures for animated models that may be sent as animation inputs 250 to the animation system 200. In some embodiments, the rig structures may the same or similar for more than one animated model when the animated models are in the same class (e.g., humans, trees, aliens). In other embodiments, the model inputs 210 may be sent to the animation system 200, and rig structures for animated models may be generated by the model generator 220. An example partial rig structure for a human animated model is depicted in FIG. 3.

The animated models may be stored in the model storage unit 230 and accessed when required. In some embodiments, the model storage unit 230 can store full sequences of animated data. The full sequences of animated data can include object, character, and motion data. The animated data can be of varying lengths.

The model storage unit 230 may also be configured to store relocation tables for relocated animation variables. In some embodiments, where each rig and sub-rig within the rig structure has a unique relocation table, the model storage unit 230 may store each of the relocation tables and association data linking each of the relocation table with its corresponding rig or sub-rig.

The animation data analyzer 240 can read and modify animated models, present data, present objects, present controls, etc. on the user interface display 280, and receive animation inputs 250 in order to determine which models to use, where, when, and how to manipulate them to form particular animated images. In some embodiments, the animation data analyzer 240 can be configured to determine the movement of an animated object visible in the animated data based on user constraints and configurations.

In some embodiments, the animation data analyzer 240 may utilize data provided as model inputs and/or animations inputs in order to realistically blend animated sequences. The animation data analyzer 240 may be configured to blend a single animated sequence into a looping sequence, or may be configured to blend two or more frames of separate animated sequences. In order to blend animation data, the animation data analyzer 240 may be configured to determine points on animated objects contained in the animation data, and use the point to determine deviations between corresponding points on two or more frames or sequences of animated data.

The animation data 240 generated by the animation data analyzer 240 may be provided to the renderer 260 in order to generate animation results. The renderer 260 may use the animation data 240, which may include three-dimensional models, objects and components, to generate a two-dimensional animated image (or a sequence of two-dimensional animated images) representing a final appearance of the models, objects and components. In some embodiments, the animation results outputted by the renderer 260 may be stored in an animation results storage unit 270.

III. Customization of Avar Locations

A. Rig Structure of Animated Models

The rigs for an animated model may be stored and presented in a nested structure. A rig for an animated model may be in a hierarchy with a main rig at the top, a plurality of sub-rigs nested beneath the main rig, and sub-sub-rigs nested beneath the sub-rigs, and so on. Typically, the avars and the functionality (e.g., movers/solvers, point deformers, transformation computation) for a particular rig are located under that rig's node in the nested structure. A single rig can be associated with one or more animated models in an animated scene. For example, if the animated scene includes a number of human characters and a number of alien character, one rig structure may be common to all characters that are classified as human characters, while a second rig structure may be common to all characters that are classified as alien characters.

FIG. 3 illustrates a rig structure 300 for an animated model in an animation system that may be used to practice some embodiments of the invention. The rig structure, as depicted, is for a human animated model. In the animation system, the rig structure is depicted as a series of nested nodes with each node representing a rig and sub-rigs. The top rig is a Human_Rig 302. Nested within the Human_Rig 302 is a Body_Rig 304. Nested within the Body_Rig 304 is a Torso_Rig 306; nested within the Torso_Rig 306 is an Arm_Rig 308; nested within the Arm_Rig 308 is a Hand_Rig 310; and nested within the Hand_Rig 310 is a Finger_Rig 312.

Thus, in order to perform a manipulation of a finger avar in rig structure 300, an animator would have to drill down through the entire nested structure from the Human_Rig 302 to the Finger_Rig 312 to access the avars under Finger_Rig 310.

Although not depicted in FIG. 3, additional rigs for Head and Lower Body may also be nested directly under the Human_Rig 302. In addition, other rig structures for other animated models may comprise more, fewer, and/or different sub-rigs than those depicted in FIG. 3 for a human animated model.

Figure 4:
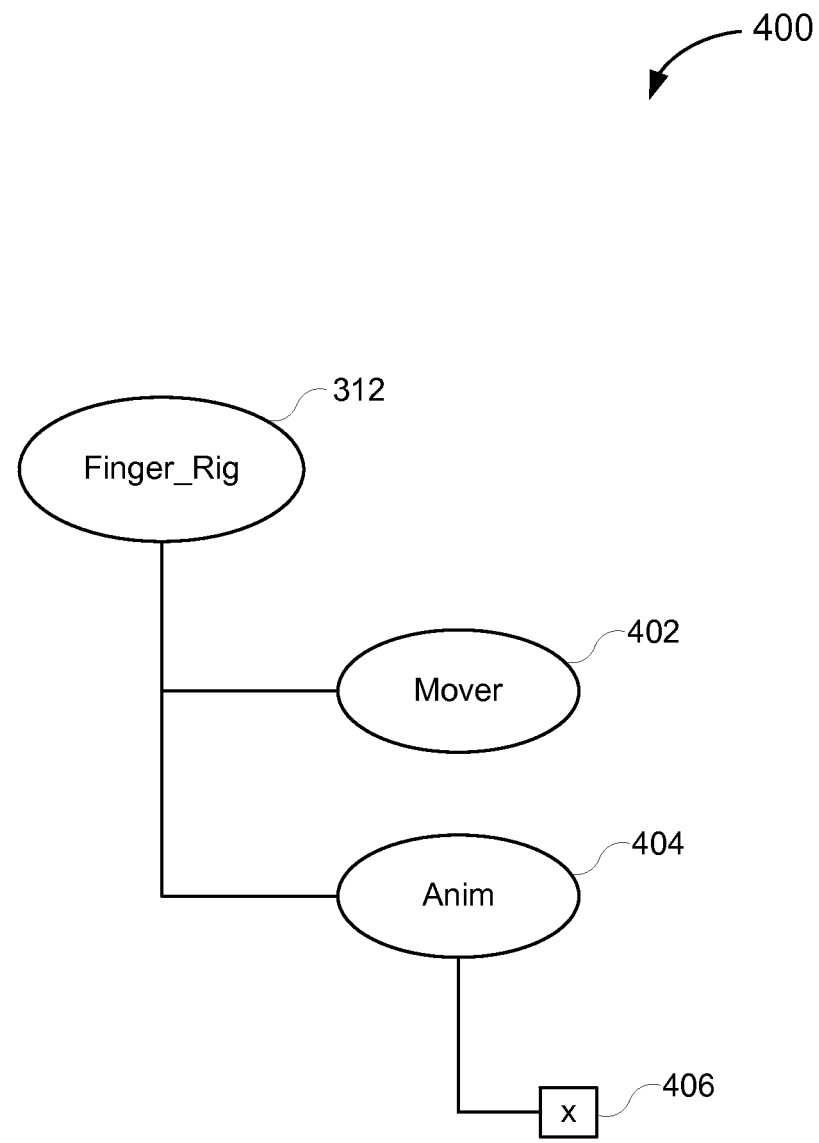
FIG. 4 illustrates a rig structure for a finger rig that may be used to practice some embodiments of the invention.

FIG. 4 illustrates a rig structure 400 for a finger rig that may be used to practice some embodiments of the invention. In the rig structure 300 from FIG. 3, Finger_Rig 312 is depicted as the lowest node in the rig structure 300. As depicted in FIG. 4, Finger_Rig 312 includes nodes for mover 402 and anim 404. The anim node 404 may typically include the animation variables that the animator may manipulate in order to modify the animated model. As depicted in FIG. 4, Finger_Rig 312 includes avar x 406. However, within the anim node 404 there may be a plurality of avars. Although Finger_Rig 312 is depicted with the mover node 402 and anim node 404, additional nodes and avars providing additional functionalities may be included but not shown.

Avar x 406 may be tied to a different manipulation of Finger_Rig 312. For example, one avar may allow the animator to bend the finger rig over a particular range, while another avar may allow the animator to twist the finger rig over a particular range. Other avars may be used to translate or scale the animated model. Some avars may be adjustable over a range from zero to 100. Other avars may be adjustable over a range from 0 degrees to 360 degrees to allow a part of the animated to be placed in any orientation. In some embodiments, an avar may be modified by the animator changing the value of the avar using a dial or by entering a new value into a field.

The mover 402 in Finger_Rig 312 may be configured to reference the avars under the anim node 404. In embodiments of the present invention, the mover 402 references the avars using the file path the avar is located in. For example, if the mover 402 needs to reference avar x 406, the mover will follow the path "Finger_Rig/Anim.x".

Figure 5:
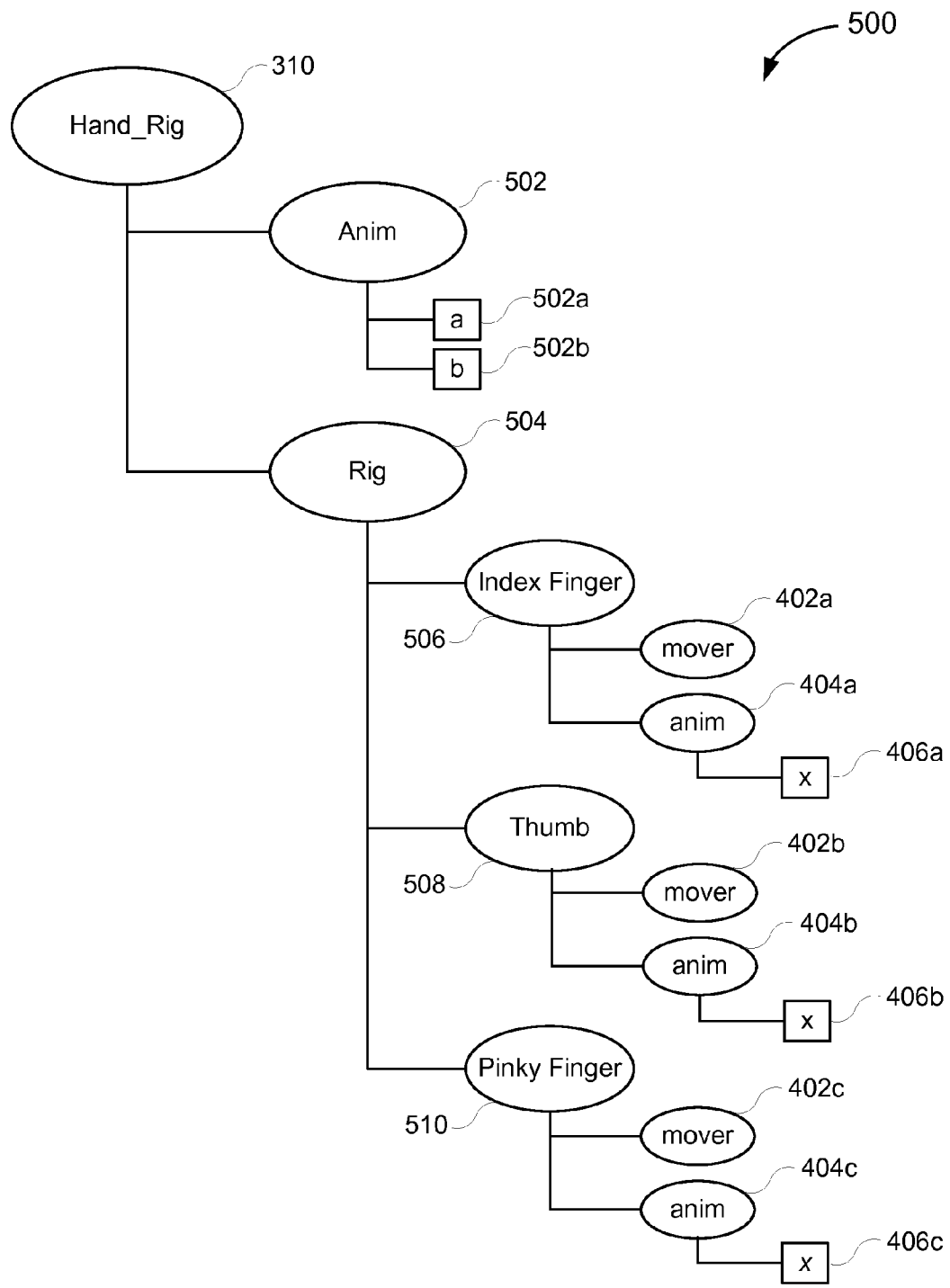
FIG. 5 illustrates a rig structure for a hand rig that may be used to practice some embodiments of the invention.

FIG. 5 illustrates a rig structure 500 for a hand rig that may be used to practice some embodiments of the invention. As depicted in FIG. 5, Hand_Rig 310 includes nodes for anim 502 and rig 504. Within the anim node 404 are a plurality of avars: a 502a and b 502b. Although Hand_Rig 310 is depicted with the anim node 502 and rig node 504, additional nodes and avars providing additional functionalities may be included but not shown.

Within the rig node 504 for the Hand_Rig 310 are a plurality of sub-nodes. For example, the sub-nodes may be for the individual fingers of the hand of the animated model. An Index Finger 506, Thumb 508, and Pinky Finger 510 are depicted in FIG. 5. Each of the sub-nodes may be instances of the Finger_Rig 312 from FIG. 4. As such, each of the Index Finger 506, Thumb 508, and Pinky Finger 510 may reference the Finger_Rig 312, as well as the movers and avars associated with the Finger_Rig 312. In some embodiments of the present invention, Index Finger 506, Thumb 508, and Pinky Finger 510 may be copies of Finger_Rig 312. They may contain all of the functionality and avars that are included in Finger_Rig 312. In alternative embodiments, Index Finger 506, Thumb 508, and Pinky Finger 510 may contain less than all of the functionality and avars of Finger_Rig 312 where not all of the contents are necessary.

When the animator needs to modify avar x 406a of Index Finger 506, the animator would access "Hand_Rig/Rig/Index Finger/anim.x." In addition, the mover 402a associated with the Index Finger avar x 406a would reference the path "Hand_Rig/Rig/Index Finger/anim.x" as well.

B. Relocating Avars

When the animator interacts with the rig structure 500 of FIG. 5, the avars for the hand are in the Anim node 502, while the avars for the individual fingers are located further down in the sub-rig under the Index Finger 506, Thumb 508, and Pinky Finger 510 nodes. This may introduce problems in that the animator would have to traverse down the rig in order to access the avars for the fingers.

Figure 6:
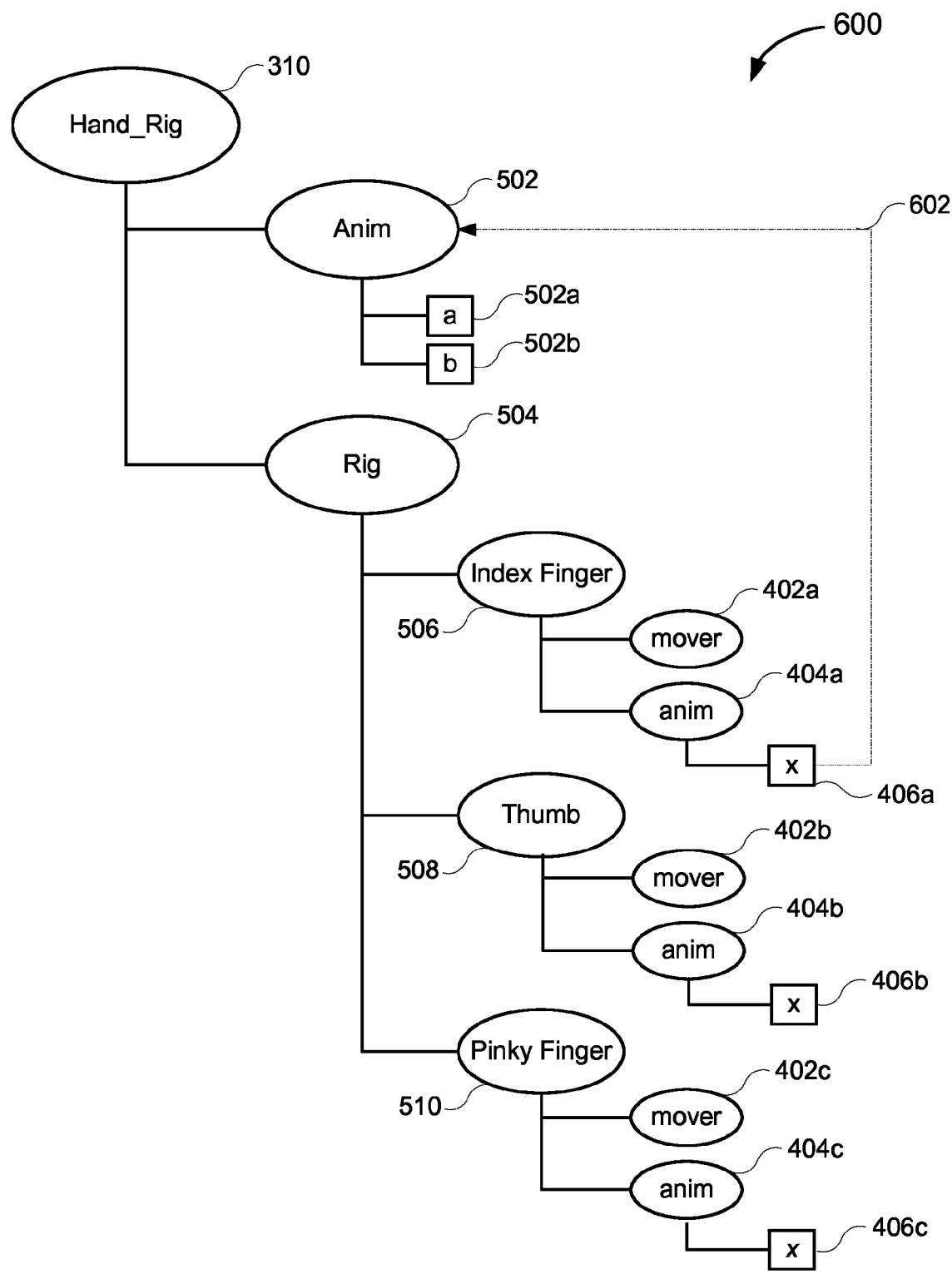
FIG. 6 illustrates a relocation operation that may be performed on a rig according to an embodiment of the invention.

FIG. 6 illustrates a relocation operation 602 that may be performed on a rig structure 600 according to an embodiment of the invention. In some embodiments, the relocation operation may be accomplished by selecting avar x 406a and dragging it to the Anim node 502, and releasing the selection. The drag and drop operation may establish an association between the first reference location and the second reference location. As shown in FIG. 6, the move operation 602 is performed on the Index Finger avar x 406a, located at "Hand_Rig/Rig/Index Finger/anim.x." In this manner, the animator may move the reference location for the individual avars from their first reference location to a second reference location. The relocation operation results in the reference location for the Index Finger avar x 406a to be modified to "Hand_Rig/Anim/Index Finger.x."

The animator may also select multiple avars and drag the avars from their first reference locations to second reference locations. In additions, a relocation may also be accomplished through processes besides manual drag and drop relocations. For example, avar relocation may also be accomplished through batch processing based on rules or criteria that are established by the animator or user. Avar relocation may be conducted without the animator or user directly interacting with avars through a graphical user interface.

Figure 7:
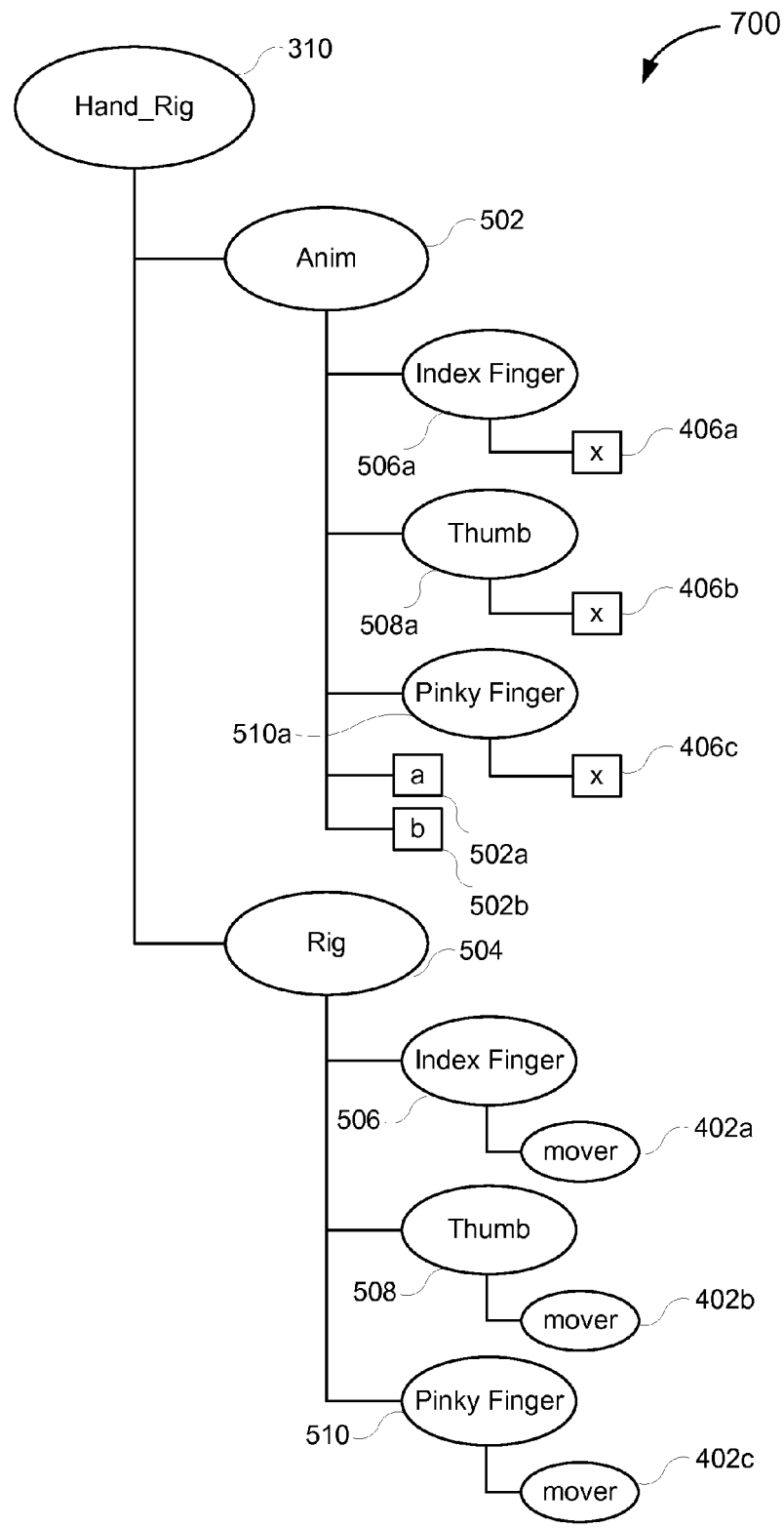
FIG. 7 illustrates a rig structure for a hand rig following a series of relocations that may be used to practice some embodiments of the invention.

FIG. 7 illustrates a rig structure 700 for a hand rig following a series of relocations that may be used to practice some embodiments of the invention. FIG. 7 depicts the resulting rig structure 700 following a series of relocations of the finger avars from the individual finger sub-rigs to the Anim node 502 of Hand_Rig 310. As shown in FIG. 7, the avars 406a, 406b, and 406c have been relocated from their original locations under individual finger nodes under the Rig node 504, to the Anim node 502. However, the locations of the movers 402a, 402b, and 402c remain in their original locations. In alternative embodiments, the relocated avars 406a. 406b, and 406c may be nested directly under the Anim node rather than nested within individual sub-nodes of the Anim node for each finger. In such embodiments, a different identifier may be used to indicate the original location associated with the relocated avars 406a, 406b, and 406c. For example, avar 406a for Index Finger may be renamed "x.Index_Finger" or an equivalent.

This process can be repeated with rigs and sub-rigs that are higher in the hierarchical rig structure 300. For example, the avars 406a, 406b, 406c, 502a and 502b in FIG. 7 may be relocated to the Arm_Rig 308. In some embodiments, the avar relocations made in one rig may propagate through the higher rigs in the rig structure 300. This allows for avar relocations made at one rig in the rig structure 300 to be known and recognized by other rigs in the rig structure 300 that may reference the relocated avar.

C. Relocation Tables

When a relocation operation is performed in the animation system, as depicted in FIGS. 6 and 7, the reference locations of the relocated avars must be preserved in order for the system to operate properly. As the movers 402a, 402b, and 402c reference the original reference locations of avars 406a, 406b, and 406c, respectively, the movers must be able to access the location of the corresponding avars, even when they have been relocated within the rig structure, in order to perform the functionalities required of the movers.

In embodiments of the present invention, when a relocation operation is performed, a relocation entry may be dynamically generated or created in a relocation table. Each rig in the rig structure 100 of FIG. 1 may have a unique relocation table that preserves the reference locations for relocated avars. In alternative embodiments, a single relocation table may be used for an entire rig structure for an animated model, and all relocation entries would be created within the single relocation table. The relocation entry may include the original reference location of the avar and the new reference location of the avar.

FIG. 8 depicts an example relocation table 800 using the rig structures depicted in FIGS. 3-6, according to an embodiment of the invention. The relocation table 800 is for Hand_Rig 310. The "Reference Location" column 802 lists the reference location (e.g., original location) for the avars that have been relocated within the Hand_Rig 310. The "Alias Location" column 804 lists the alias location (e.g., the relocated location or new location) for the avars that have been relocated within the Hand_Rig 310.

When a mover attempts to reference the location of a relocated avar in a particular rig, the animation system automatically accesses the relocation table associated with the particular rig. The animation system may then parse through the relocation entries in the relocation table to determine the alias (or relocated location) of the relocated avar. Once the animation system determines the alias location, the mover is automatically redirected to the alias of the avar. The mover may be automatically redirected by temporarily modifying the pointer address for the mover to the alias location. The animation system may also maintain the original pointer address directing the mover to the original reference location and redirect the pointer address to the alias location. In embodiments of the present invention, the animation system may access and parse the relocation table whenever a mover attempts to reference any avar in the animated model.

For example, when the Index Finger mover 402a tries to reference the Index Finger avar x 406a at "Hand_Rig/Rig/Index Finger/Anim.x," the reference table will be accessed and the mover will be redirected to "Hand_Rig/Anim/Index Finger.x" as the new location of Index Finger avar x 406a.

Continuing the previous example, when the avars 406a, 406b, 406c, 502a and 502b in FIG. 7 are relocated to the Arm_Rig 308, the animation system would conduct another series of relocates and modify relocation entries for the avars in the appropriate relocation tables for the Arm_Rig and Hand_Rig.

In embodiments of the present invention, when an avar is moved, the animation system may be configured to determine whether the avar being moved from a first location to a second location is being moved across references or from one root to another root. If the animation system determines the second location is within the same root as the first location, generating a relocation entry may not necessary. However, in some embodiments, all relocation processes may be captured and relocation entries generated regardless of whether the animation variable was moved to a different node within the rig structure.

The replacement table for a rig or sub-rig may be stored in a separate space in the animation system 200. For example, the replacement table may be stored in the model storage 230 with scoping that associates the replacement table with the appropriate rig or sub-rig so that it may be accessed when necessary. In other embodiments of the present invention, the replacement table for a rig or sub-rig may be stored in an object or node as part of the corresponding rig or sub-rig.

In addition to displaying the appropriate avars and rigs when a node is selected on a display, the relocation table may also be accessed when a non-graphical-related call or request is made by an animator or user. For example, when the system receives a request for the children of Hand_Rig, the system will access the relocation table associated with Hand_Rig and provide a response that includes all relocated avars and nodes related to Hand_Rig.

The relocation table may also be accessed by a user to reference back to where a relocated avar was originally located (e.g., the first reference location). For example, in order to debug the system, the user accessing the relocated location of the an avar may need to know where the original location of the avar was. The user can consult the relocation table for the rig associated with the avar, look up the alias location in the Alias Location" column 804, and determine the corresponding reference location in the "Reference Location" column 802.

D. Example Method

Figure 9:
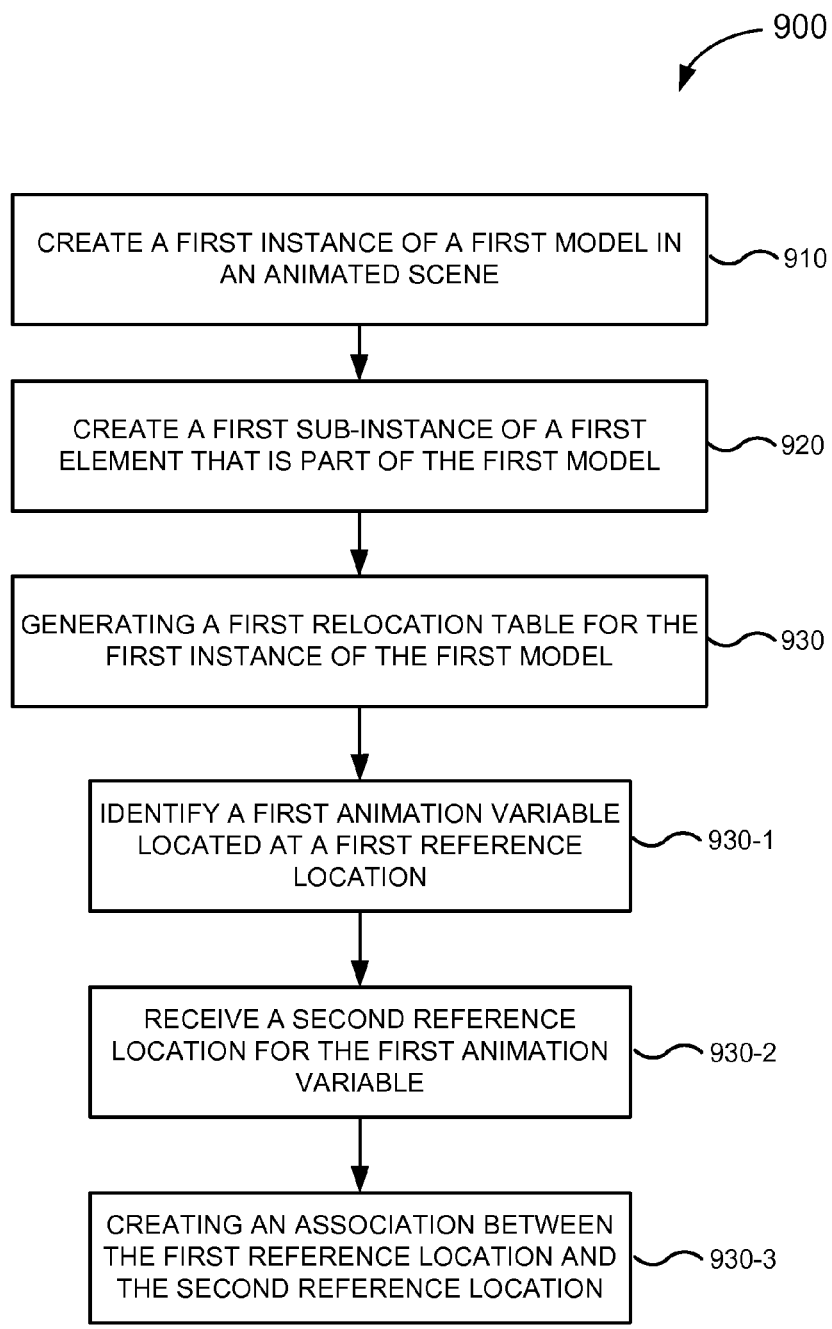
FIG. 9 is a simplified flowchart of a method in various embodiments for relocating animation variables within an animation system according to an embodiment of the invention.

FIG. 9 is a simplified flowchart 900 of a method in various embodiments for relocating animation variables within an animation system according to an embodiment of the invention.

In step 910, the animation system creates a first model in an animated scene. The model (or animated model) may be a character, a prop, a set, or a background associated with the animated scene. In some embodiments, model may refer to a full character (e.g., an animated character such as Buzz Lightyear). However, model may also refer to a portion of the full character (e.g., a hand or an arm). In some embodiments, the animated model may be inputted by a user into the animation system 200 as pre-formed animation inputs 250 or may be generated by the model generator 220 based on user specifications and model inputs 210. The animated model may comprise a series of rigs and sub-rigs modeled into a hierarchical structure, as depicted in FIGS. 3-7.

In step 920, the animation system creates a first instance of a first element that is part of the first model. For example, where the animated model is a human, elements of the human animated model may include a head, a body, and legs. Elements may be further comprised of sub-elements where an instance of an element may be composed of sub-instances of sub-elements. For example, a human animated model may include two instances of a hand element, each having five sub-instances of a finger sub-element. The reference to instances and sub-instances are used to differentiate between elements and sub-elements of the animated model.

In embodiments, the first element references a first element rig, and changes to instances of the first element in the animated scene are determined according to the first element rig. Similarly, a sub-instance of a first sub-element of the first element may reference a first sub-rig, and changes to sub-instances of the first sub-element in the animated scene may be determined according to the first sub-rig. The first element rig and the first sub-rig may include a plurality of operators (e.g., movers, deformers, transformers) and animation variables (avars) that can be modified by a user to manipulate the element or sub-element associated with the rig. For example, an arm element may reference an arm rig that includes all the functionalities and avars to allow the user to manipulate the arm element.

In step 930, the animation system generates a first relocation table for the first model. In some embodiments, there are individual relocation tables for each rig within the rig structure (e.g., a relocation table for Hand_Rig and a relocation table for Arm_Rig, for example). In other embodiments, a single relocation table may be established for an entire rig structure of an animated model with all relocations made throughout the rig structure entered into the single relocation table. In one implementation, step 930 can be implemented by sub-steps 930-1, 930-2, and 930-3.

FIG. 8 depicts an example relocation table 800 for Hand_Rig 310 from FIG. 7, which includes a "Reference Location" column 802 listing the reference location (e.g., original location) for the avars that have been relocated within the Hand_Rig 310. Relocation table 800 also includes an "Alias Location" column 804 listing the corresponding alias location (e.g., the relocated location or new location) for the avars that have been relocated within the Hand_Rig 310.

In step 930-1, the animation system identifies a first animation variable located at a first reference location. In embodiments, the animation system may identify the first animation variable based on a received selection of an animation variable. In some embodiments, a user or animator may select one or more of a plurality of animation variables for the animated model each having a different first reference location. The first animation variable may include a first reference location indicating its location within the first model. The first reference location may be a default location created based on the animation inputs 250 when the animated model was generated. The first reference may be a location that the animation variable was previously relocated to in a prior animation variable relocation process.

Using FIG. 6 as an example, the user may select Index Finger avar x 406a. The first reference location for Index Finger avar x 406a is "Hand_Rig/Rig/Index Finger/anim.x".

In step 930-2, the animation system receives a second reference location for the first animation variable. The animation system may receive the second reference location based on the location where the animation variable was relocated. The second reference location for the animation variable may identify the animation variable as being for a first sub-rig of a first sub-element of the first element. The relocation process may be accomplished via a drag-and-drop operation from the first reference location to the second reference location. The drag-and-drop operation may be performed through a visual interface. In other embodiments, the relocation process may be accomplished by a command inputted by the user into the animation system.

An example drag-and-drop operation is depicted as the dashed line 602 in FIG. 6. In this example, after the user selects Index Finger avar x 406a at its first reference location, the user may translate the Index Finger avar x 406a to a second reference location: "Hand_Rig/Anim/Index Finger.x". The result of the relocation operation is depicted in FIG. 7 showing the relocated location of Index Finger avar x 406a.

In step 930-3, the animation system creates an association between the first reference location and the second reference location, such that when the first animation variable is accessed at the first reference location, the second reference location is accessed. In embodiments, this association may include the animation system generating a relocation entry for the animation variable. In order to preserve the referencing for the relocated animation variable, the animation system generates a relocation entry for the relocated animation variable. The relocation entry may include both the first reference location (e.g., the starting point of the current relocation process), and the second reference location (e.g., the ending point of the current relocation process). As movers within the animation system need to access animation variables in order to perform the functionality and/or movement required by the animator, an alias may be created such that when the mover attempts to access the animation variable at the first reference location, the mover may be automatically re-directed to the second reference location. As example relocation entry resulting from the relocation of Index Finger avar x 406a, as depicted in FIGS. 6-7, is shown as a relocation entry 806 in relocation table 800 illustrated in FIG. 8.

When a relocation entry already exists for a particular animation variable, a new relocation entry may not be generated. Instead, the existing relocation entry may be updated with the new alias location (e.g., the second reference location).

Once the relocation entry for the relocated animation variable has been generated, the animation system may store the relocation entry for the relocated animation variable in the relocation table.

Figure 10:
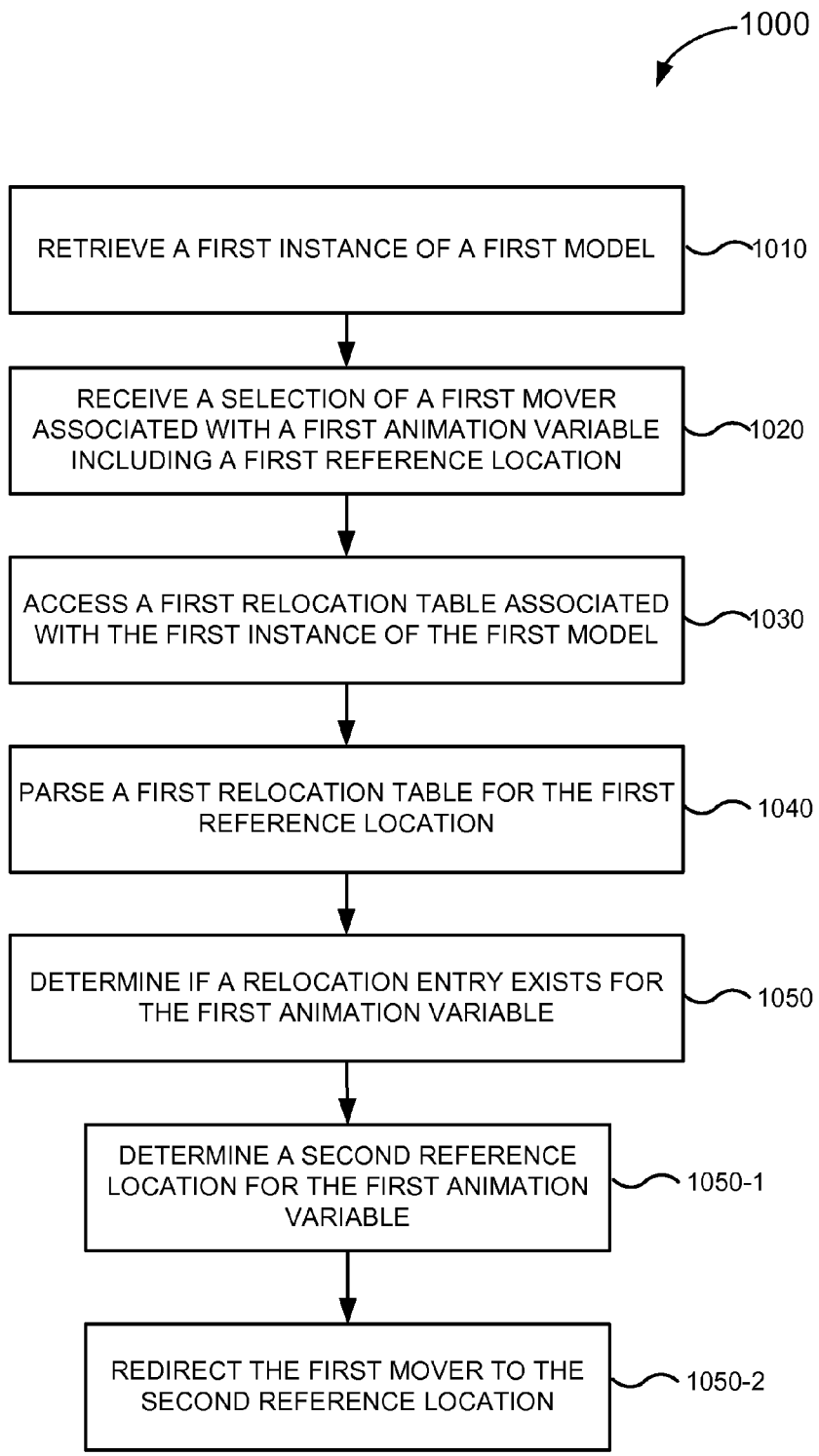
FIG. 10 is a simplified flowchart of a method in various embodiments for accessing a relocation table for a relocated animation variable within an animation system according to an embodiment of the invention.

FIG. 10 is a simplified flowchart 1000 of a method in various embodiments for accessing a relocation table for a relocated animation variable within an animation system according to an embodiment of the invention.

In step 1010, the animation system retrieves a first model. In some embodiments, the animated model may be retrieved from a model storage unit 230 in the animation system. In other embodiments, the animated model may be received as model inputs 210 or animation inputs 250 provided to the animation system.

In step 1020, the animation system receives a selection of a first mover associated with a first animation variable including a first reference location. In embodiments, the animation system receives a selection of the mover by a user or animator selecting the mover within the hierarchical rig structure. In other embodiments, the selection of the mover may be received via code or a command entered by the user. The mover may be associated with the first animation variable and be configured to determine a value associated with the first animation variable. For example, the first animation variable may be a control representing an angle of a particular element of the animated model (e.g., the angle of a finger being pointed), with the value of the first animation variable a numerical value in degrees.

The mover may also include a first reference location for the first animation variable. The first reference location may be the default location for the first animation variable (e.g., based on how the animated model was generated).

In step 1030, the animation system accesses a first relocation table associated with the first model. Based on the mover that was selected, the animation system may access the first relocation table associated with the rig that the mover is associated with. For example, using FIG. 7, if mover 402a is selected, the relocation table for Hand_Rig 310 would be accessed by the animation system. In some embodiments, the relocation table may be retrieved from a model storage unit 230 in the animation system depicted in FIG. 2. In some embodiments, a single relocation table may be used for the entire model In step 1040, the animation system parses a first relocation table for the first reference location. Once the animation system has accessed and retrieved the appropriate relocation table, the animation system may parse the relocation table. Parsing the first relocation table may involve the animation system analyzing each entry in the relocation table against the first reference location received with the mover.

In step 1050, the animation system determines if a relocation entry exists for the first animation variable. Based on the analysis of each entry in the relocation table against the first reference location received with the mover, the animation system can determine whether a relocation entry exists for the first animation variable. In one implementation, step 1050 can be implemented by sub-steps 1050-1 and 1050-2.

In step 1050-1, the animation system determines a second reference location for the first animation variable. When the animation system determines that a relocation entry exists for the first animation variable, the animation system further analyzes the relocation entry. As part of this analysis, the animation system determines the second reference location (e.g., the alias location or the relocated location) of the first animation variable.

In step 1050-2, the animation system redirects the first mover to the second reference location. In embodiments, once the animation system has determined the second reference location of the animation variable, the animation system can redirect the mover to the second reference location. The mover may be automatically redirected by temporarily modifying the pointer address for the mover to the alias location. The animation system may also maintain the original pointer address directing the mover to the original reference location and redirect the pointer address to the second reference location.

Once the mover has been redirected to the second reference location, the mover can access the first animation variable and determine the value associated with the first animation variable. The mover may use the value to perform further functionality or operations to the animated model.

IV. Customizing the Scope of Avar Modifications

A. Scope of Modifications to Avars

When an animator makes a modification to an animation variable (or avar), the animator may want to control the scope of the modification within the animation system. In other words, depending on the modification and the context, the animator may want the modification to the avar to be a local modification or a global modification.

For example, a finger rig may have been built with the finger with a straight orientation. But a scene may require the finger to have a bent orientation. The animator may modify one or more avars in the context of a specific animated scene in order to produce the bent orientation for the one finger in the one animated scene.

In some situations it would be more useful and less resource-consuming and time-consuming if the finger rig had a bent orientation as its default. As another example, in order to create a more realistic looking finger, a bulge may need to be added. Previously, this could only be accomplished by going down into the Finger Rig, making the modification to the desired avar, and letting the modification propagate through the animation system to effect all instances of the avar. However, this solution would not allow the animator to establish a scope for the modification if the animator only wants the modification for one character or a class of characters. By modifying the avar for the finger at the finger rig, the change will propagate through every character referencing the finger rig.

B. Bi-Directional Modifications to Avars

In embodiments of the present invention, the animator can make a modification to an avar in the context of an animated scene. For example, the animator may make the modifications to avars while inspecting the results in a display, which may be visualizing an approximation of a rendering of an animated scene or a full render of an animated scene. The animator can those choose to make a modification to an avar a default for all fingers in all animated scenes involving all instances of the avar. In addition, the animator can make it a default for all fingers in all animated scenes for all instances of the avar associated with one animated model, for all animated characters within the same class as the animated model (e.g., all human characters), or even more specifically to all instances of the right index finger of all human characters.

By making the modification to the avar while working with a specific character in the context of an animated scene, the animator can determine whether the modification should propagate down through the hierarchy and how far down the modification should propagate through the hierarchy. Using the example above, the animator may want to apply the finger bulge to only the one finger of the animated character that the bulge was applied to. Alternatively, the animator may want to apply the finger bulge to all the fingers of the animated character.

In some embodiments of the present invention, when the animator makes a modification to an avar in the context of the animated scene, the animator may be presented with an interface allowing the animator to establish the scope of the modification to the avar. In such embodiments, the animator may use the interface to define the scope of the modification to the avar. For example, the animator may establish a local scope applying to a single instance of an avar, or the animator may establish a broader scope applying the modification to a set of instances of the avar.

Establishing the scope of a modification to an avar may be accomplished in different ways. For example, the animator may access a menu to select a layer file (e.g., via a pull-down or drop-down menu on a visual display), which may be used to determine the files to which subsequent modifications are to be applied. If the animator makes a modification to the selected layer file, all scenes that share the selected layer file will receive that modification. In another embodiment, the animator may select a shared class node in the scene hierarchy. Avar modifications made by the animator can be applied directly to the shared class node, and as a result, all instances of the class (e.g., the rigs and characters that reference the shared class node) may be modified in the same manner. In addition, establishing the scope of a modification to an avar may be accomplished by other means as would be understood by one of ordinary skill in the art.

C. Example Method

Figure 11:
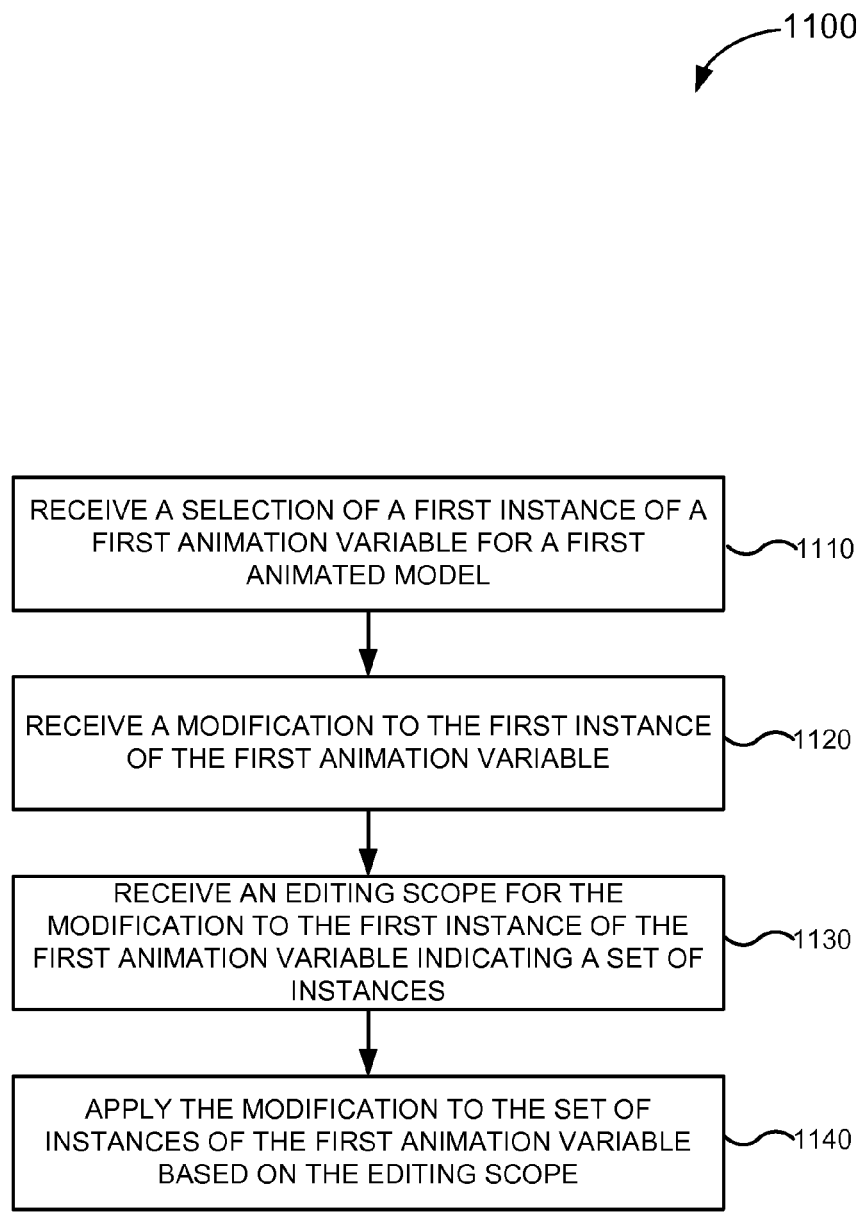
FIG. 11 is a simplified flowchart of a method in various embodiments for establishing the scope of modifications to animation variables within an animation system according to an embodiment of the invention.

FIG. 11 is a simplified flowchart 1100 of a method in various embodiments for establishing the scope of modifications to animation variables within an animation system according to an embodiment of the invention.

In step 1110, the animation system receives a selection of a first instance of a animation variable ("avar") for a first animated model. In some embodiments, a user may make a selection of a first instance of an avar which is received by the animation system. The user may select the first instance of the avar while in the context of an animated scene that includes the animated model. For example, the user may be interact with a visual control element (e.g., a knob, a dial, a bar, or a field) associated with the first instance of the avar. When the user interacts with the visual control element, the animation system may receive an indication that the user has selected the visual control element.

The user may also select the first instance of the avar while in a hierarchical rig structure for the animated mode. In some embodiments, a user or animator may select one or more of a plurality of instances of the avar for the animated model.

In step 1120, the animation system receives a modification to the first instance of the first animation variable. When the user performs a modification with the selected the visual control element, the animation system may receive an indication that the user has performed the modification with the visual control element. The modification may include a customization to a value associated with the first instance of the avar, or a directional or visual change may be made to the first instance of the avar.

In step 1130, the animation system receives an editing scope for the modification to the first instance of the first animation variable indicating a set of instances. In some embodiments, when the user makes the modification to the first instance of the avar, an editing scope interface may be presented by the animation system. The editing scope interface may be configured to receive the editing scope for the modification from the user. The editing scope interface may allow the user to establish whether the modification to the first instance of the avar is to be applied to other instances of the avar. For example, the user may be able to define the modification to the first instance of the avar to apply to all instances of the avar associated with the animated model, to all instances of the avar associated with a class of characters (e.g., humans, female characters, robots), or to all instances of the avar associated with all animated models in the animated scene. The editing scope provided by the user may be defined by the animation system as the set of instances of the avar that are to receive the modification.

In step 1140, the animation system applies the modification to the set of instances of the animation variable based on the editing scope. Based on the editing scope received via the editing scope interface, the animation system may perform the modification to the set of instances of the avar. Applying the modification to the set of instances of the animation variable may include propagating the modification through the animated model or models in the animation system Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

Where "each" is used with reference to a set of things with a characteristic and/or a feature, it is not meant to exclude the case of a set of things each having the characteristic or feature and additional things beyond the set that do not necessarily have that characteristic or feature.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to example illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

The specification and drawings are, accordingly, to be regarded in an illustrative rather than a restrictive sense. It will, however, be evident that various modifications and changes may be made thereunto without departing from the broader spirit and scope of the application as set forth in the claims.

What is claimed is:

1. A method of providing customization of animation variables for models in an animated scene, the method comprising:
   creating a first model in the animated scene;
   creating a first instance of a first element that is part of the first model, wherein the first element references a first element rig, and wherein changes to instances of the first element in the animated scene are determined according to one or more animation variables of the first element rig, wherein each of the one or more animation variables of the first element rig is accessible at a corresponding location associated with the first element rig; and
   generating a first relocation table for the first element rig of the first model, the generating including:
      identifying a first animation variable for the first element rig that is referenced through a first location associated with a sub-rig of the first element rig;
      obtaining a second location where the first animation variable is accessible, the second location being associated with the first element rig; and
      creating an association between the first location and the second location, wherein when the first animation variable is referenced through the first location, the first animation variable is accessed at the second location, and wherein the association between the first location and the second location is created based on a relocation operation that relocates the first animation variable from the first location to the second location such that the first animation variable does not reside at the first location; and,
   wherein the method is performed by a computer system.

2. The method of claim 1, wherein creating the first model in the animated scene includes creating a hierarchical association between the first instance of the first element and a first sub-instance of a first sub-element.

3. The method of claim 1, wherein a first relocation entry for the first animation variable is generated in the first relocation table when the first animation variable at the first location is associated with the second location.

4. The method of claim 1, further comprising:
   obtaining a request for the first location associated with the first animation variable at the second location;
   parsing the first relocation table;
   identifying a first relocation entry for the first animation variable; and
   providing the first location associated with the second location in the first relocation entry.

5. The method of claim 1, further comprising identifying a first relocation entry for the first animation variable, wherein the identifying comprises:
   locating the second location in the first relocation table; and
   determining the corresponding first location.

6. The method of claim 1, wherein the first relocation table is stored in an animation system and associated with the first element rig of the first model.

7. The method of claim 1, wherein the association between the first location and the second location is propagated through the first model.

8. A computer product comprising a non-transitory computer readable medium storing a plurality of instructions for controlling one or more processors to perform the method of claim 1.

9. The method of claim 1, wherein the first location is not associated with the first element rig.

10. The method of claim 1, further comprising effectuating relocating the first animation variable from the first location to the second location.

11. The method of claim 1, further comprising receiving a request to relocate the first animation variable from the first location to the second location.

12. The method of claim 1, wherein the first model comprises a first mover element that references the first animation variable at the first location.

13. The method of claim 1, wherein the first element rig is a hand rig.

14. A method of accessing animation variables for an animated model in an animated scene, the method comprising:
   retrieving a first model in the animated scene;
   obtaining a selection of a first mover associated with a first animation variable for the first model, wherein the first mover includes a first location for the first animation variable, the first location being associated with a sub-rig of a first element rig of the first model, the first mover determining a value of the first animation variable;
   accessing a first relocation table associated with the first model;
   parsing the first relocation table for the first location for the first animation variable;
   determining whether a relocation entry exists in the first relocation table for the first animation variable; and
   when the relocation entry for the first animation variable exists:
      determining a second location for the first animation variable from the relocation entry for the first animation variable, wherein the first animation variable is relocated from the first location to the second location such that the first animation variable does not reside at the first location; and
      redirecting the first mover to the second location for the first animation variable,
   wherein the method is performed by a computer system.

15. The method of claim 14, further comprising: when the relocation entry for the first animation variable is not in the relocation table, directing the first mover to the first location for the first animation variable.

16. The method of claim 14, wherein the first relocation table includes all relocation entries for the first model.

17. The method of claim 14, wherein redirecting the first mover to the second location for the first animation variable includes redirecting a pointer address for the first mover from the first location to the second location.

18. A computer product comprising a non-transitory computer readable medium storing a plurality of instructions for controlling one or more processors to perform the method of claim 14.

* * * * *